(12) United States Patent
Degani et al.

(10) Patent No.: US 12,021,608 B2
(45) Date of Patent: Jun. 25, 2024

(54) APPARATUS, SYSTEM AND METHOD OF WIRELESS COMMUNICATION BY AN INTEGRATED RADIO HEAD

(71) Applicant: INTEL CORPORATION, Santa Clara, CA (US)

(72) Inventors: Ofir Degani, Nes-Ammin (IL); Ehud Reshef, Qiryat Tivon (IL); Eytan Mann, Modiin (IL); Ashoke Ravi, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 134 days.

(21) Appl. No.: 17/763,642

(22) PCT Filed: Dec. 26, 2019

(86) PCT No.: PCT/US2019/068549
§ 371 (c)(1),
(2) Date: Mar. 24, 2022

(87) PCT Pub. No.: WO2021/133393
PCT Pub. Date: Jul. 1, 2021

(65) Prior Publication Data
US 2022/0294527 A1     Sep. 15, 2022

(51) Int. Cl.
*H04B 7/24* (2006.01)
*H04B 7/0413* (2017.01)

(52) U.S. Cl.
CPC .......... *H04B 7/24* (2013.01); *H04B 7/0413* (2013.01)

(58) Field of Classification Search
CPC ...... H04B 7/24; H04B 7/0413; H04W 88/085
See application file for complete search history.

(56) References Cited

U.S. PATENT DOCUMENTS

| 10,484,078 B2 | 11/2019 | Gharavi et al. |
| 2012/0224541 A1* | 9/2012 | Yoshiuchi ............. H04W 16/10 370/329 |

(Continued)

FOREIGN PATENT DOCUMENTS

| WO | 2012/087287 | 6/2012 |
| WO | 2022/066161 | 3/2022 |
| WO | 2022/098342 | 5/2022 |

OTHER PUBLICATIONS

International Preliminary Report on Patentability for International Application No. PCT/US2019/068549, dated Jul. 7, 2022, 13 pages.

(Continued)

*Primary Examiner* — Sung S Ahn
(74) *Attorney, Agent, or Firm* — Shichrur & Co.

(57) ABSTRACT

Some demonstrative embodiments may include an apparatus including an integrated Radio Head (RH), the integrated RH including an antenna; a transceiver chain to transmit a Radio Frequency (RF) transmit (Tx) signal via the antenna, and to receive an RF Receive (Rx) signal via the antenna; a Physical layer (PHY) time-domain (TD) processor configured to generate a digital PHY TD Rx signal based on the RF Rx signal, and to cause the transceiver chain to transmit the RF Tx signal based on a digital PHY TD Tx signal; and a digital interface to communicate the digital PHY TD Tx signal and the digital PHY TD Rx signal over a digital link.

23 Claims, 5 Drawing Sheets

(56) References Cited

U.S. PATENT DOCUMENTS

| | | |
|---|---|---|
| 2015/0087248 A1 | 3/2015 | Yehezkely |
| 2017/0238361 A1* | 8/2017 | Pawar .................... H03M 7/40 455/561 |
| 2018/0019865 A1* | 1/2018 | Lee ....................... H04J 3/0685 |
| 2018/0234117 A1 | 8/2018 | Saban et al. |
| 2019/0020401 A1 | 1/2019 | Gharavi et al. |
| 2022/0210731 A1 | 6/2022 | Friedman et al. |

OTHER PUBLICATIONS

International Search Report and the Written Opinion for International Application No. PCT/US2019/068549, dated Sep. 22, 2020, 16 pages.

Search Report for European Patent Application No. 19957366.8, dated Aug. 30, 2023, 8 pages.

* cited by examiner

APPARATUS, SYSTEM AND METHOD OF WIRELESS COMMUNICATION BY AN INTEGRATED RADIO HEAD

TECHNICAL FIELD

Embodiments described herein generally relate to wireless communication by an integrated radio head.

BACKGROUND

An increasing demand for wireless data traffic requires wireless transceivers to support wider bandwidths (BW) and higher-order modulations schemes.

To increase throughput the wireless transceivers may implement a Multiple Input Multiple Output (MIMO) scheme, which may require an increased amount of co-located wireless transceivers.

Usage of the co-located wireless transceivers may result in cross interference, power consumption limitations, thermal limitations, and many other technical problems.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
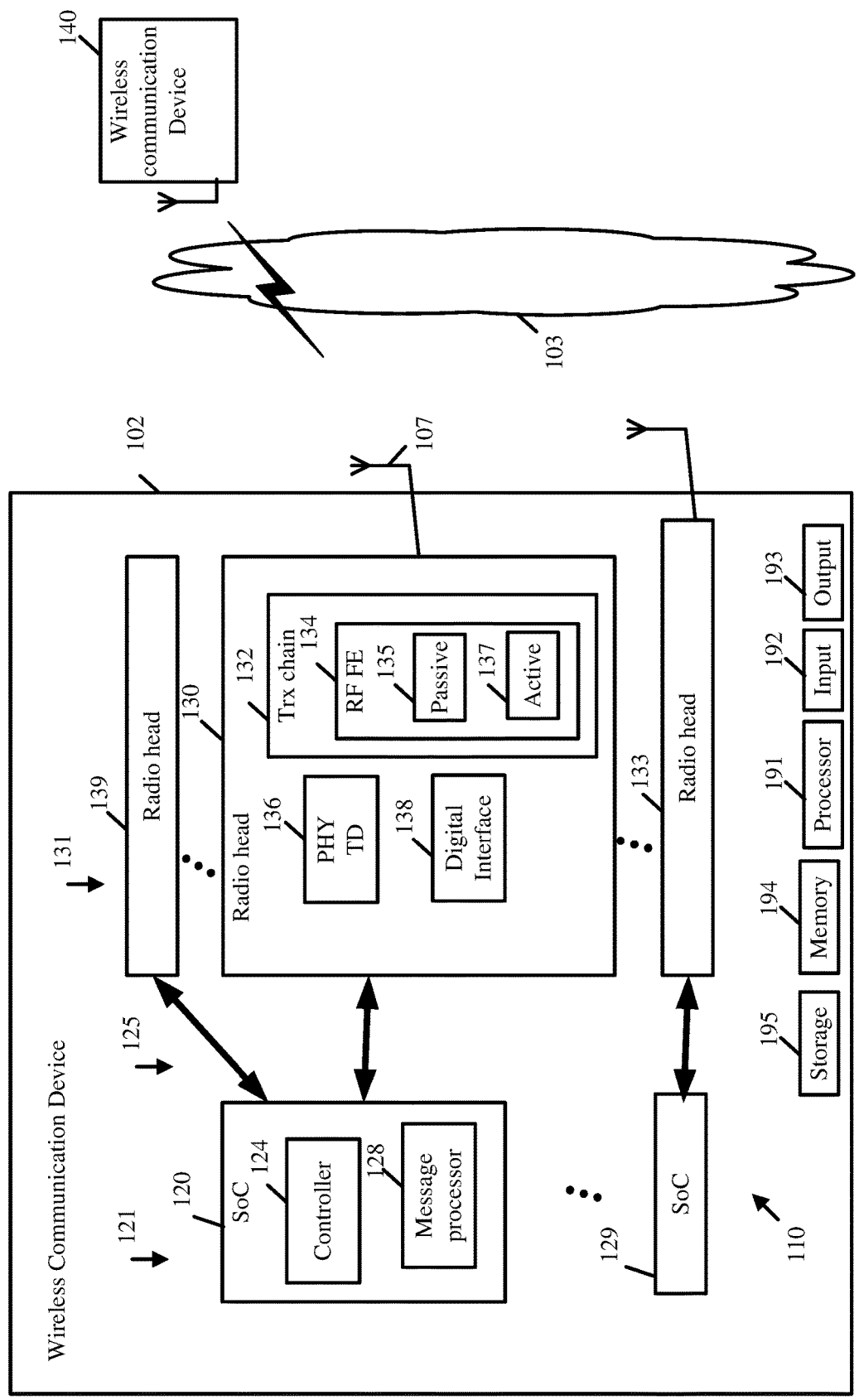
FIG. 1 is a schematic block diagram illustration of a system, in accordance with some exemplary embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2016 (IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016)), and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), Time-Division Multiplexing (TDM), Time-Division Multiple Access (TDMA), Multi-User MIMO (MU-MIMO), General Packet Radio Service (GPRS), extended GPRS (EGPRS), Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz, 5 GHz, and/or 6-7 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Some demonstrative embodiments may be implemented for "peer to peer (PTP) communication", which may relate to device-to-device communication over a wireless link ("peer-to-peer link") between devices. The PTP communication may include, for example, a Wi-Fi Direct (WFD) communication, e.g., a WFD Peer to Peer (P2P) communication, wireless communication over a direct link within a Quality of Service (QoS) basic service set (BSS), a tunneled direct-link setup (TDLS) link, a STA-to-STA communication in an independent basic service set (IBSS), a Wi-Fi Aware communication, or the like. Other embodiments may be implemented for any other additional or alternative communication scheme and/or technology.

Reference is now made to FIG. 1, which schematically illustrates a block diagram of a system 100, in accordance with some exemplary embodiments.

As shown in FIG. 1, in some demonstrative embodiments, system 100 may include a wireless communication network including one or more wireless communication devices, e.g., a wireless communication device 102, and/or at least one wireless communication device 140.

In some demonstrative embodiments, wireless communication device 102 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 and/or device 140 may include, operate as, and/or perform the functionality of one or more STAs. For example, device 102 may include at least one STA, and/or device 140 may include at least one STA.

In some demonstrative embodiments, device 102 and/or device 140 may include, operate as, and/or perform the functionality of one or more WLAN STAs.

In some demonstrative embodiments, device 102 and/or device 140 may include, operate as, and/or perform the functionality of one or more Wi-Fi STAs.

In one example, a station (STA) may include a logical entity that is a singly addressable instance of a medium access control (MAC) and physical layer (PHY) interface to the wireless medium (WM). The STA may perform any other additional or alternative functionality.

In some demonstrative embodiments, devices 102 and/or 140 may include a non-AP STA or an access point (AP) STA.

In one example, an AP may include an entity that contains a station (STA), e.g., one STA, and provides access to distribution services, via the wireless medium (WM) for associated STAs. The AP may perform any other additional or alternative functionality.

In one example, a non-AP STA may include a STA that is not contained within an AP. The non-AP STA may perform any other additional or alternative functionality.

In some demonstrative embodiments, device 102 and/or device 140 may include, operate as, and/or perform the functionality of, any other devices and/or STAs.

In some demonstrative embodiments, device 102 may include, for example, one or more of a processor 191, an input unit 192, an output unit 193, a memory unit 194, and/or a storage unit 195. Device 102 may optionally include other suitable hardware components and/or software components. In some demonstrative embodiments, some or all of the components of device 102 may be enclosed in a common housing or packaging, and may be interconnected or operably associated using one or more wired or wireless links. In other embodiments, components of device 102 may be distributed among multiple or separate devices.

In some demonstrative embodiments, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications.

In some demonstrative embodiments, input unit 192 may include, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Solid State Drive (SSD), a Compact Disk (CD) drive, a CD-ROM drive, a DVD drive, or other suitable removable or non-removable storage units. Memory unit 194 and/or storage unit 195, for example, may store data processed by device 102.

In some demonstrative embodiments, wireless communication device 102 may be capable of communicating content, data, information and/or signals via a wireless medium (WM) 103.

In some demonstrative embodiments, wireless medium 103 may include, for example, a radio channel, a channel, a cellular channel, a Global Navigation Satellite System (GNSS) Channel, an RF channel, a WiFi channel, an IR channel, and the like.

In some demonstrative embodiments, wireless communication medium 103 may include a 2.4 GHz frequency band, and/or one or more other wireless communication frequency bands, for example, a 5 GHz frequency band, a 6-7 GHz frequency band, a millimeterWave (mmWave) frequency band, e.g., a 60 GHz frequency band, a Sub-1 GHz (S1G) band, and/or any other frequency band.

In some demonstrative embodiments, device 102 and/or device 140 may include, operate as, perform the role of, and/or perform one or more functionalities of, one or more STAs.

In some demonstrative embodiments, device 102 and/or device 140 may form, or may communicate as part of, a wireless local area network (WLAN).

In some demonstrative embodiments, device 102 and/or device 140 may form, or may communicate as part of, a WiFi network.

In other embodiments, device 102 and/or device 140 may form, and/or communicate as part of, any other additional or alternative network.

In some demonstrative embodiments, an increasing demand for wireless data traffic may require wireless transceivers to support wider bandwidths (BW), e.g., a BW of 320MHz or more, and/or higher-order modulations schemes, e.g., a modulation schemes of up to 4k Quadrature Amplitude Modulation (QAM), or more.

In some demonstrative embodiments, there may be continuous demand to improve power, cost and form factor of wireless devices, which may be mobile and battery powered. This demand may be achieved, for example, by high level of integration and/or advanced digital Complementary Metal-Oxide-Semiconductor (CMOS) processes.

In some demonstrative embodiments, one or more technologies may be used and/or considered to increase throughput, for example, MIMO technology, e.g., 2×2, 3×3, 4×4 MIMO or more, Distributed Input/Distributed Output (DIDO) networks, and/or multi-radio systems.

In some demonstrative embodiments, these technologies and others may require using an increased number of co-located transceiver chains.

In some demonstrative embodiments, in some use cases, and/or scenarios, there may be a need to address one or more technical problems, for example, when implementing co-located transceiver chains, e.g., as described below.

In one example, usage of co-located transceiver chains may result in cross interference, power consumption limitations, thermal limitations, fanout, and/or RF front-end complexity.

In another example, an integration and co-location of co-located transceiver chains may pose limitations on overall system performance and capabilities. For example, implementing an RF coax cable to connect antennas to a wireless communication processor may result in a cable loss, e.g., in excess of 2 dB at 60 cm. The cable loss may limit system performance and/or antenna placement, and/or may increase system cost. Moreover, the cable loss may limit smart antenna applications, for example, Voltage Standing Wave Ratio (VSWR) correction and/or the like.

In some demonstrative embodiments, for example, in one or more use cases and/or scenarios, implementation of co-located transceiver chains may have one or more technical inefficiencies, disadvantages and/or technical problems, e.g., as described below.

In one example, a discrete implementation, which may be implemented, for example, in a laptop, may include a network card including either MAC and Radio (PHY) or only Radio (PHY) connected to an SoC with low speed Input/Output (IO), e.g., a Peripheral Component Interconnect Express (PCIe) or a proprietary interface, e.g., analog or digital, and with RF cables to a passive antenna. This discrete implementation may include a "discrete" solution where all components of multiple transceivers, e.g., including the MAC, PHY, RF and FEM, may be integrated on a same board, e.g., on a single chip or a plurality of chips, and connected on one end to an SoC with PCIe I/O, and on the other end to passive antennas with a coax.

In another example, an Integrated Connectivity scheme (CNVi/CNVr) may include a MAC integrated in an SoC connected with a proprietary I/O to a card, e.g., an M.2 card, integrating a PHY, RF and a FEM, while connection to antennas may be via coax cable, e.g., similar to the discrete implementation.

In some demonstrative embodiments, the discrete implementation and the integrated connectivity scheme may offer limited configuration, e.g., such as a 2×2 transceiver, for example, due to thermal and power consumption limitations, a need to use a relatively expensive coax cable, and/or high losses depending on cable length.

In another example, a tri-module approach, which may be implemented, for example, in a mobile cellular phone, may be a more expensive approach to enhance performance. The tri-module approach may include a MAC chip and a PHY/RF chip connected to a Front-End Module (FEM) connected to an antenna. The FEM may a Low-Noise Amplifier (LNA), a Power Amplifier (PA), a T/R Switch, and a Diplexer. This configuration, in some cases, may include an "active antenna" controller, for example, due to close proximity of the components. According to this example, the RF FEM may be separate from the transceiver. However, this configuration may not maintain a reasonable distance between the transceiver and the front-end module.

For example, the "tri-module" configuration may be referred to as an active antenna module, in which the PA, LNA and FEM may be separated from the main RF and placed closer to the antenna, and connected with coax between RF and FEM. The cellular configuration may offer an improved power and thermal Key Performance Indicators (KPIs), at the expense of substantially increased cost. This configuration may be more suitable for cellphone scale systems and may not be easily scalable to larger platforms, and/or may not have a modular certification.

In some demonstrative embodiments, the technologies described above may result in co-location issues, size issues, an increased cost, reduced KPIs, reduced scalability, and/or flexibility limitations.

For example, the technologies described above may not allow, e.g., may make it hard or impossible, to optimize system performance, for example, by placing RF components near the antennas.

In some demonstrative embodiments, device 102 may be configured to address one or more technical problems, for example, when using co-located transceiver chains, e.g., as described below.

In some demonstrative embodiments, device 102 may be configured to support and/or implement a Distributed Radio System (DRS) architecture 110, which may be based on "atomistic" scalable approach, e.g., as described below.

In some demonstrative embodiments, the DRS architecture 110 may include and/or implement a radio head (RH) unit, e.g., including a single transceiver chain, and a time-domain PHY of the transceiver chain, e.g., as described below.

In some demonstrative embodiments, the RH may be located at, near, or on, an antenna, and connected to a System on Chip (SoC), for example, with a digital link, for example, high throughput I0 link, e.g., as described below.

In some demonstrative embodiments, the DRS architecture 110 may support any suitable number and/or arrangement of RHs, e.g., as described below.

In some demonstrative embodiments, device 102 may include a SoC 120, for example, configured to generate and/or process one or more signals, and/or to control, trigger and/or cause one or more operations and/or functionalities of device 102, e.g., as described below.

In one example, SoC 120 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, e.g., as described below.

include In some demonstrative embodiments, SoC 120 may include a controller 124 configured to perform and/or to trigger, cause, instruct and/or control device 102 and/or DRS 110 to perform, one or more communications, to generate and/or communicate one or more messages and/or transmissions, and/or to perform one or more functionalities, operations and/or procedures.

In some demonstrative embodiments, controller 124 may include, or may be implemented, partially or entirely, by circuitry and/or logic, e.g., one or more processors including circuitry and/or logic, memory circuitry and/or logic, MAC circuitry and/or logic, PHY circuitry and/or logic, BB circuitry and/or logic, a BB processor, a BB memory, AP circuitry and/or logic, an AP processor, an AP memory, and/or any other circuitry and/or logic, configured to perform the functionality of controller 124. Additionally or alternatively, one or more functionalities of controller 124 may be implemented by logic, which may be executed by a machine and/or one or more processors, e.g., as described below.

In some demonstrative embodiments, at least part of the functionality of controller 124 may be implemented as part of one or more elements of SoC 120.

In other embodiments, the functionality of controller 124 may be implemented as part of any other element of device 102 and/or DRS 110.

In some demonstrative embodiments, SoC 120 may include a message processor 128 configured to generate, process and/or access one or more messages communicated by DRS 110 and/or device 102.

In one example, message processor 128 may be configured to generate one or more messages to be transmitted by DRS 110 and/or device 102, and/or message processor 128 may be configured to access and/or to process one or more messages received by DRS 110 and/or device 102, e.g., as described below.

In one example, message processor 128 may include at least one first component configured to generate a message, for example, in the form of a frame, field, information element and/or protocol data unit, for example, a MAC Protocol Data Unit (MPDU); and/or at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message; In other aspects, message processor 128 may be configured to perform any other additional or alternative functionality and/or may include any other additional or alternative components to generate and/or process a message to be transmitted.

In some demonstrative embodiments, message processor 128 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processor 128, respectively. Additionally or alternatively, one or more functionalities of message processor 128 may be implemented by logic, which may be executed by a machine and/or one or more processors, e.g., as described below.

In some demonstrative embodiments, at least part of the functionality of message processor 128 may be implemented as part of SoC 120.

In some demonstrative embodiments, at least part of the functionality of message processor 128 may be implemented as part of controller 124.

In other embodiments, the functionality of message processor 128 may be implemented as part of any other element of device 102 and/or DRS 110.

In some demonstrative embodiments, DRS 110 may include one or more integrated Radio Heads (RHs) 131, e.g., as described below.

For example, the one or more RHs 131 may include an RH 130 and/or an RH 139, e.g., as described below.

In some demonstrative embodiments, an integrated RH of the one or more RHs 131, e.g., RH 130, may include a regulatory pre-certified RH. For example, RH 130 may be certified by a regulatory authority, for example, as a stand-alone unit, for example, even before implementation of RH 130 as part of device 102.

In some demonstrative embodiments, an integrated RH of the one or more RHs 131, e.g., RH 130, may include a multi-band RH configured for concurrent operation over a plurality of wireless communication frequency bands, e.g., as described below.

For example, RH 130 may be configured to communicate over a first frequency band, e.g., the 2.4 GHZ band, and to communicate over a second frequency band, e.g., the 5 GHZ and/or 6-7 GHz bands.

In some demonstrative embodiments, an integrated RH of the one or more RHs 131, e.g., RH 130, may include an antenna 107, e.g., as described below.

In one example, antenna 107 may include any type of antennas suitable for transmitting and/or receiving wireless communication signals, blocks, frames, transmission streams, packets, messages and/or data. For example, antenna 107 may include any suitable configuration, structure and/or arrangement of one or more antenna elements, components, units, assemblies and/or arrays. In some embodiments, antenna 107 may implement transmit and receive functionalities using separate transmit and receive antenna elements. In some embodiments, antenna 107 may implement transmit and receive functionalities using common and/or integrated transmit/receive elements.

In some demonstrative embodiments, SoC 120 may be configured to generate one or more PHY TD Tx signals for transmission by the one or more integrated RHs 131, and to perform PHY frequency-domain (FD) processing of one or more PHY TD Rx signals from the one or more integrated RHs 131, e.g., as described below.

In some demonstrative embodiments, DRS 110 may include one or more cables 125 to connect between the SoC and the one or more integrated RHs 131. For example, DRS 110 may include a cable 123 to connect between RH 139 and SoC 120 and a cable 127 to connect between RH 130 and SoC 120.

In some demonstrative embodiments, the one or more cables 125 may include one or more digital input/output (IO) cables, e.g., as described below.

In some demonstrative embodiments, RH 130 may include a transceiver (TRx) chain 132 configured to transmit an RF Tx signal via the antenna 107, and/or to receive an RF Rx signal via the antenna 107, e.g., as described below.

In one example, transceiver chain 132 may include one or more wireless Rx components including circuitry and/or logic to receive wireless communication signals, RF signals, frames, blocks, transmission streams, packets, messages, data items, and/or data; and/or one or more wireless Tx components including circuitry and/or logic to transmit wireless communication signals, RF signals, frames, blocks, transmission streams, packets, messages, data items, and/or data.

For example, transceiver chain 132 may include circuitry; logic; Radio Frequency (RF) elements, circuitry and/or logic; modulation elements, circuitry and/or logic; demodulation elements, circuitry and/or logic; amplifiers; analog to digital and/or digital to analog converters; filters; and/or the like.

In some demonstrative embodiments, RH 130 may include a PHY time-domain (TD) processor 136 configured to generate a digital PHY TD Rx signal, for example, based on the RF Rx signal from SoC 120, e.g., as described below.

In some demonstrative embodiments, PHY TD processor 136 may cause the transceiver chain 132 to transmit the RF Tx signal, for example, based on the digital PHY TD Tx signal, e.g., as described below.

In some demonstrative embodiments, RH 130 may include a digital interface 138 to communicate the digital PHY TD Tx signal, and the digital PHY TD Rx signal over a digital link from SoC 120, e.g., as described below.

In some demonstrative embodiments, digital interface 138 may be configured to communicate the digital PHY TD Tx signal and the digital PHY TD Rx signal via a digital input/output (IO) cable, for example, via cable 127, e.g., as described below.

In some demonstrative embodiments, digital interface 138 may be configured to communicate the digital PHY TD Tx signal and the digital PHY TD Rx signal with a PHY FD processor separated from the integrated RH 130, for example, a PHY FD processor in SoC 120, e.g., as described below.

In some demonstrative embodiments, device 102 may include a plurality of RHs 131. For example, device 102 may include RH 130 and RH 139, and one or more other RHs.

In some demonstrative embodiments, the plurality of RHs 131 may include at least a first integrated RH and a second integrated RH, which is non-collocated with the first integrated RH, e.g., as described below.

In one example, RH 139 and RH 130 may be non-collocated.

In some demonstrative embodiments, the first integrated RH and the second integrated RH may be on opposite sides of device 102.

In one example, RH 139 and RH 130 may be on opposite sides of device 102.

In some demonstrative embodiments, SoC 120 may be configured to control concurrent communication via two or more of the plurality of integrated RHs 131, e.g., as described below.

In one example, SoC 120 may control concurrent communication via RH 130 and RH 139, which may be configured for the concurrent operation over the plurality of wireless communication frequency bands.

In some demonstrative embodiments, SoC 120 may be configured to perform PHY FD processing, for example, based on a combination of two or more PHY TD Rx signals from two or more respective integrated RHs, and to generate two or more PHY TD Tx signals for the two or more respective integrated RHs based on PHY FD processing of data to be transmitted by the two or more respective integrated RHs, e.g., as described below.

In one example, SoC 120 may perform the PHY FD processing, for example, based on a combination of two PHY TD Rx signals from RH 130 and RH 139, and may generate two PHY TD Tx signals for RH 130 and RH 139, for example, based on PHY FD processing of data to be transmitted by RH 130 and RH 139.

In some demonstrative embodiments, SoC 120 may be configured to control selective activation for communication of one or more of the plurality of integrated RHs 131, e.g., as described below.

In one example, SoC 120 may control selective activation for communication of RH 130 and/or RH 139.

In some demonstrative embodiments, device 102 may include a first SoC, e.g., connected to a first plurality of integrated RHs, and a second SoC connected to a second plurality of integrated RHs, e.g., as described below.

In one example, device 102 may include an SoC 129 connected to a plurality of RHs 133, and SoC 120 may be connected to the plurality of integrated RHs 131.

In some demonstrative embodiments, the first SoC may be connected to the second SoC, e.g., as described below.

In some demonstrative embodiments, the first and second SoCs may be configured to cooperatively process communications over the first and second pluralities of integrated RHs, e.g., as described below.

In one example, SoC 120 may be connected to SoC 129, and SoC 120 and 129 may be configured to cooperatively process communications over the plurality of RHs 131 and 133.

In some demonstrative embodiments, RH 130 may include an RF chip integrated with the antenna 107, e.g., as described below.

In some demonstrative embodiments, the RF chip may include the transceiver chain 132, the PHY TD processor 136, the digital interface 138, and/or any other elements of radio head 130, e.g., as described below.

In some demonstrative embodiments, the transceiver chain 132 may include an RF Front End (FE) 134, e.g., as described below.

In some demonstrative embodiments, the RF FE 134 may include an active FE 137 including one or more amplifiers, e.g., as described below.

In some demonstrative embodiments, the RF FE 134 may include a passive FE 135 including one or more passive filters, e.g., as described below.

In some demonstrative embodiments, RH 130 may include a single-antenna RH including a single antenna 107 and a single transceiver chain 132, e.g., as described below.

In one example, transceiver chain 132 may receive an RF Rx signal via antenna 107. According to this example, PHY TD processor 136 may generate a digital PHY TD Rx signal based on the RF Rx signal; digital interface 138 may communicate the digital PHY TD Rx signal from the integrated RH 130 to SoC 120 via cable 125; and SoC 120 may perform the PHY FD processing of the PHY TD Rx signal, e.g., as described above.

In another example, SoC 120 may generate a digital PHY TD signal for transmission by the integrated RH 130. According to this example, digital interface 138 may communicate the digital PHY TD Tx signal from the SoC 120 to PHY TD processor 136 of integrated RH 130 via cable 125; PHY TD processor 136 may generate an RF Tx signal based on the digital PHY TD Tx signal; and transceiver chain 132 may transmit the RF Tx signal via the antenna 107, e.g., as described above.

In some demonstrative embodiments, DRS 110 may provide a highly flexible and/or scalable solution. In one example, DRS 110 may support using a same integrated RH for different DRS, e.g. 1×1 , 2×2, 3×3 configurations, and the like. In another example, DRS 110 may support and/or integrate multi-standard RHs, which may be implemented to support multiple communication standards, e.g. LTE, Wi-Fi, and the like. In another example, DRS 110 may support use of a same integrated RH for multiple applications, e.g., ranging from cellphone, laptop, AP, IOT and/or the like. In another example, DRS 110 may support flexible transceiver and/or antenna location, for example, as digital IO cable may be extended to meters with low power/performance impact, which may be applicable to large systems, e.g., industrial robots and the like.

In some demonstrative embodiments, DRS 110 may provide improved KPIs, for example, lower Noise Figure (NF), e.g., improved RX sensitivity, higher Tx power out, reduced power consumption, e.g., due to close proximity of antenna and RF, which may reduce the loss of the cable from antenna to active components.

In some demonstrative embodiments, DRS 110 may reduce cross talk and interference, for example, as multiple radios may not be integrated on a same die.

In some demonstrative embodiments, DRS 110 may reduce thermal density, for example, due to implementation of a single radio on an antenna module.

In some demonstrative embodiments, DRS 110 may support integration of "smart" antenna applications, for example, due to close proximity of RF and digital content die to an antenna.

In some demonstrative embodiments, DRS 110 may retain a "modular regulatory certification", for example, due to the digital interface and/or "self-contained" nature of the integrated RH, e.g., different from configurations, in which an analog FEM is separate from a modem.

In some demonstrative embodiments, DRS 110 may support connection of multiple RHs, e.g., more than two RHs, to a single SoC or Modem, and/or dynamic selection of active RHs. This capability may be valuable, for example, for "transformer" and/or "detachable" form-factors, where at a first system configuration it may be better to have antennas at a first location, and at a second system configuration, e.g., different from the first system configuration, it may be better to have the antennas at a different location.

In some demonstrative embodiments, DRS 110 may support, e.g., easily support, a multi antenna BT scheme.

Figure 2:
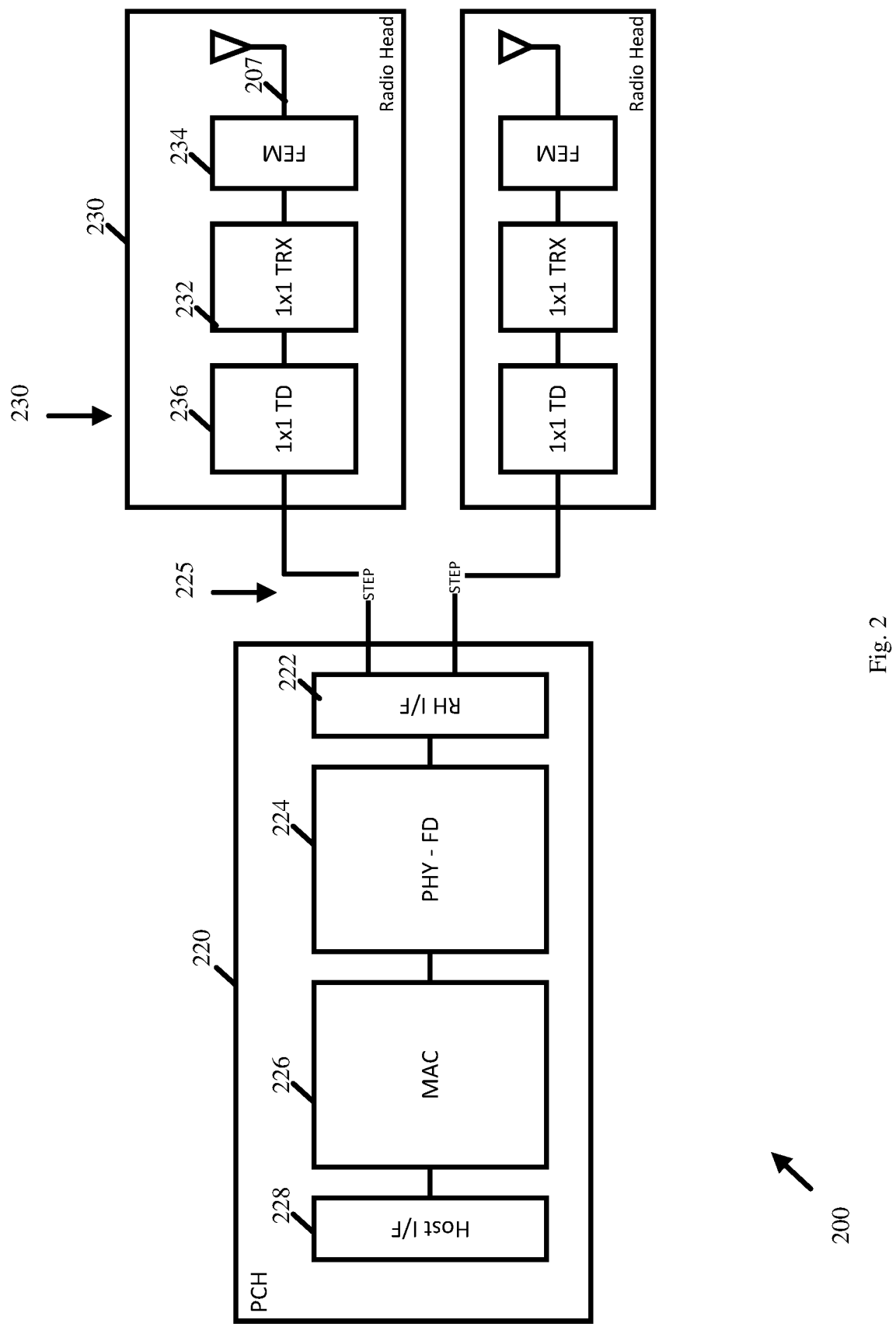
FIG. 2 is a schematic block diagram illustration of a Distributed Radio System (DRS), in accordance with some exemplary embodiments.

Reference is made to FIG. 2, which schematically illustrates a DRS scheme 200, in accordance with some exemplary embodiments.

In some demonstrative embodiments, as shown in FIG. 2, DRS scheme 200 may include a plurality of RHs 230 connected, e.g., with a plurality of cables 225, to a SoC 220. For example, RH 130 (FIG. 1) may include, perform the functionality of, and/or perform one or more operations of, an RH 230; cables 125 (FIG. 1) may include, perform the functionality of, and/or perform one or more operations of, cables 225; and/or SoC 120 (FIG. 1) may include, perform the functionality of, and/or perform one or more operations of, SoC 220.

In some demonstrative embodiments, as shown in FIG. 2, an RH 230 may include an antenna 207, a FEM 234, a TRx chain 232, e.g., a 1×1 TRx chain, and a PHY TD processor 236. For example, FE 134 (FIG. 1) may include, perform the functionality of, and/or perform one or more operations of, FEM 234; TRx 132 (FIG. 1) may include, perform the functionality of, and/or perform one or more operations of, TRx 232; and/or PHY TD processor 136 (FIG. 1) may include, perform the functionality of, and/or perform one or more operations of, PHY TD processor 236.

In some demonstrative embodiments, as shown in FIG. 2, SoC 220 may include an RH interface 222, e.g., to interface between RHs 230 and SoC 220, a PHY FD processor 224, a MAC 226, and a host interface 228, e.g., as described below.

In some demonstrative embodiments, as shown in FIG. 2, a single (1x1) transceiver, e.g., TRx 232, with FEM, e.g., FEM 234, and a TD PHY, e.g., TD PHY 236 may be placed together with an antenna, e.g., antenna 207, for example, to create a radio head module, e.g., radio head 203, for example, instead of collocated transceivers on an RF die.

In some demonstrative embodiments, as shown in FIG. 2, the RH module 230 may be connected to the SoC 220, which includes the FD PHY 224, for example, with high speed digital I/O 225, e.g., a STEP interface or any other interface.

In some demonstrative embodiments, an I/O cable 225 may be much less sensitive to length, e.g., cost and performance wise, and, accordingly, the RHs 230 may be placed at practically any distance from the SoC 220, for example, at lower cost.

In some demonstrative embodiments, placing RH 230, including FEM 234, closer to antenna 207 may improve Tx output power, power consumption and/or Rx noise figure, e.g., Rx sensitivity, for example, as a lossy coax cable may not be required. In addition, the removal of the coax cable may reduce cost, while performance may be improved, e.g., beyond performance of a tri-module approach.

In some demonstrative embodiments, DRS scheme 200 may support High order MIMO systems, for example, by adding more RHs 230 and connecting the RHs 230 to the SoC 220, which may create a distributed system rather than prevalent collocated radio system.

In some demonstrative embodiments, DRS scheme 200 may support improved thermal and RF interference, for example, as the RHs 230 may be separated and/or remote, which may allow more flexibility and/or ease in multi-antenna MIMO systems, e.g., 4×4 MIMO and 8×8 MIMO systems.

In some demonstrative embodiments, DRS scheme 200 may support controllable "smart" antenna features, for example, due to implementation of digital circuitry at close proximity on the antenna 207, as well as practically no loss between RF module 230 and antenna 207.

Figure 3:
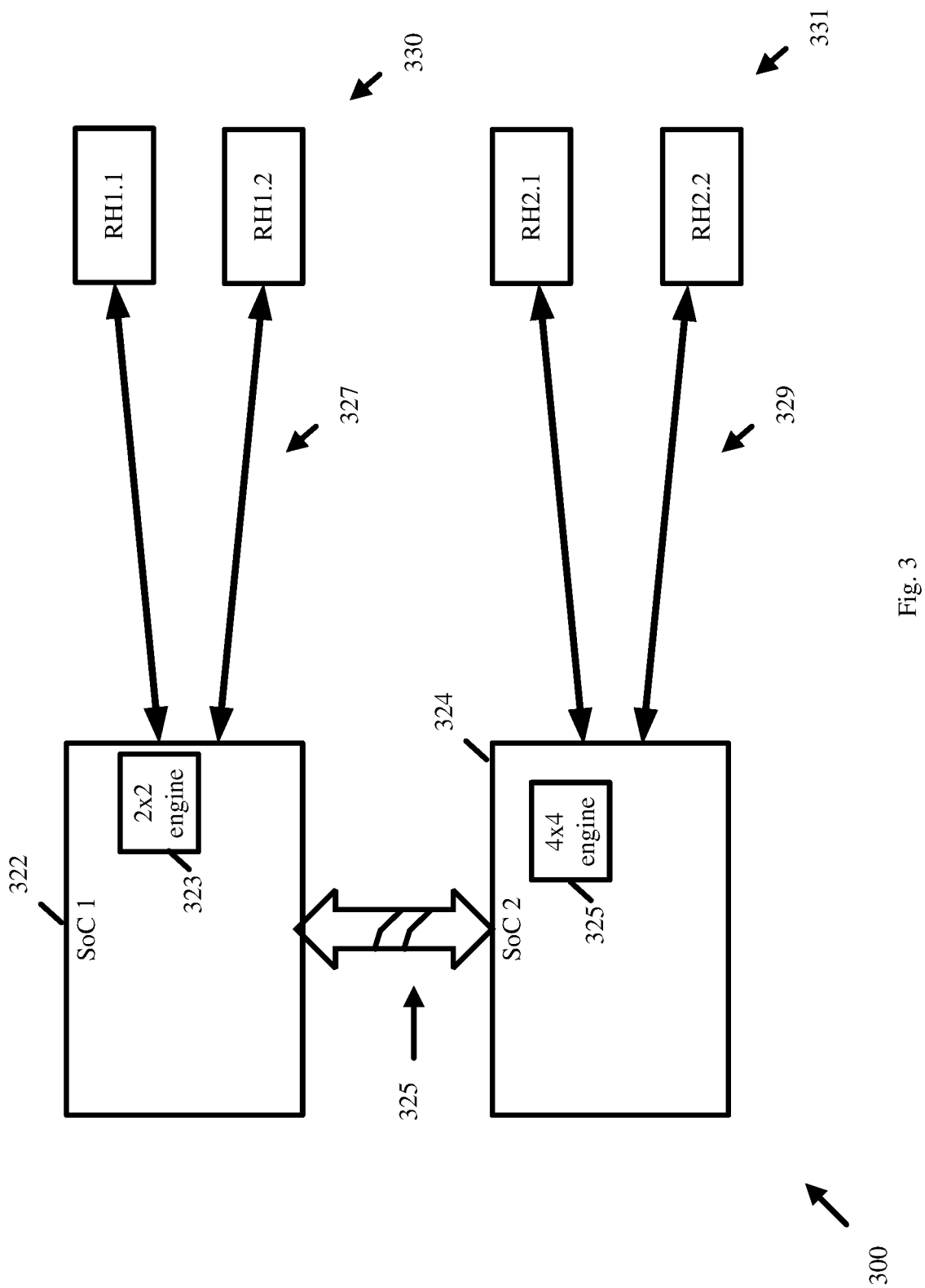
FIG. 3 is a schematic block diagram illustration of a detachable DRS scheme, in accordance with some exemplary embodiments.

Reference is made to FIG. 3, which schematically illustrates a detachable DRS scheme 300, in accordance with some exemplary embodiments.

In some demonstrative embodiments, as shown in FIG. 3, DRS scheme 300 may include a first plurality of RHs 330 connected with a respective plurality of cables 327 to a first SoC 322, and a second plurality of RHs 331 connected with a respective plurality of cables 329 to a second SoC 324. For example, RH 130 (FIG. 1) may include, perform the functionality of, and/or perform one or more operations of, an RH of the plurality of RHs 330 and/or 331; cables 125 (FIG. 1) may include, perform the functionality of, and/or perform one or more operations of, cables 327 and/or 329; and/or SoC 120 (FIG. 1) may include, perform the functionality of, and/or perform one or more operations of, an SoC of SoC 322 and/or SoC 324.

In some demonstrative embodiments, as shown in FIG. 3, SoC 322 and SoC 324 may be connected with a detachable cable 325.

In some demonstrative embodiments, as shown in FIG. 3, SoC 322 may include a processor 323 configured to process signals communicated according to a 2×2 MIMO scheme.

In some demonstrative embodiments, SoCs 322 and 324 may operate independently, for example, at a detached operation mode. For example, at the detached mode of operation, SoC 322 may be configured to process and/or control communication via RHs 330; and/or SoC 324 may be configured to process and/or control communication via RHs 331, separately from and/or independently from SoC 322.

In some demonstrative embodiments, SoCs 322 and 324 may be configured to cooperatively process communications over pluralities of integrated RHs 330 and 331, for example, at a connected operation mode, e.g., as described below.

In some demonstrative embodiments, as shown in FIG. 3, SoC 324 may include a processor 325 configured to process signals communicated according to a 4×4 MIMO scheme, for example, when connected to SoC 322 with detachable cable 325.

Figure 4:
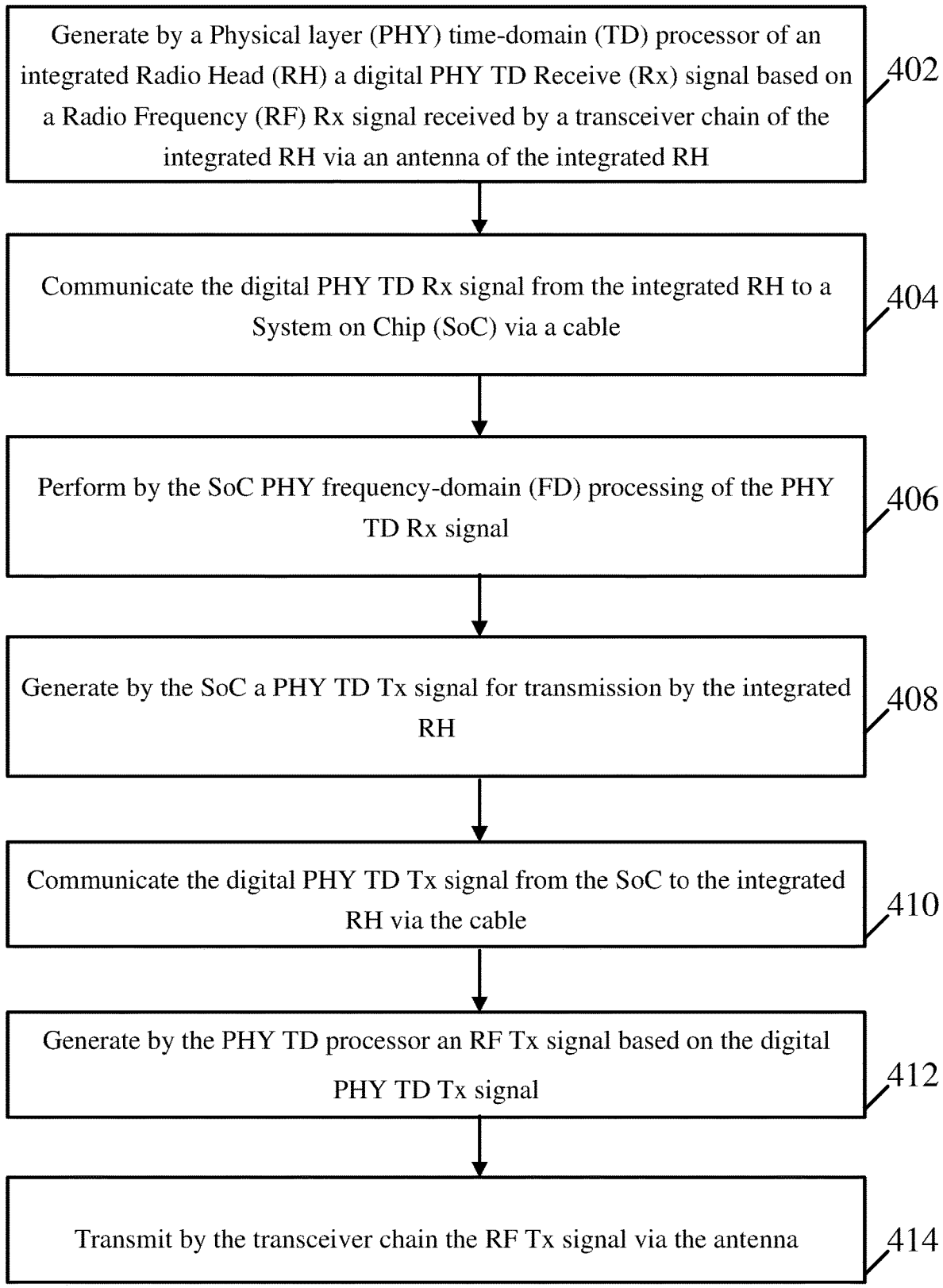
FIG. 4 is a schematic flow-chart illustration of a method of wireless communication, in accordance with some exemplary embodiments.

Reference is made to FIG. 4, which schematically illustrates a method of wireless communication at a DRS of a wireless communication device, in accordance with some exemplary embodiments. For example, one or more operations of the method of FIG. 4 may be performed by one or more elements of a system, e.g., system 100 (FIG. 1), for example, one or more wireless devices, e.g., device 102 (FIG. 1), a DRS, e.g., DRS 110 (FIG. 1), an integrated Radio Head, e.g., integrated RH 130 (FIG. 1), an SoC, e.g., SoC 120 (FIG. 1), a PHY TD processor, e.g., PHY TD processor 136 (FIG. 1), a transceiver chain, e.g., transceiver chain 134 (FIG. 1), a digital interface, e.g., digital interface 138 (FIG. 1), a controller, e.g., controller 124 (FIG. 1), and/or a message processor, e.g., message processor 128 (FIG. 1).

In some demonstrative embodiments, as shown in FIG. 4, the method may include processing of an Rx signal for communication prior to communication of a Tx signal, e.g., as described below. In other embodiments, communication of the Tx signal may be before the processing of the Rx signal.

As indicated at block 402, the method may include generating by a PHY TD processor of an integrated RH a digital PHY TD Rx signal based on an RF Rx signal received by a transceiver chain of the integrated RH via an antenna of the integrated RH. For example, PHY TD processor 136 (FIG. 1) may generate the digital PHY TD Rx signal based on the RF Rx signal received by the transceiver chain 132 (FIG. 1) via antenna 107 (FIG. 1), e.g., as described above.

As indicated at block 404, the method may include communicating the digital PHY TD Rx signal from the integrated RH to an SoC via a cable. For example, digital interface 138 (FIG. 1) may communicate the digital PHY TD Rx signal from the integrated RH 130 (FIG. 1) to SoC 120 (FIG. 1) via cable 125 (FIG. 1), e.g., as described above.

As indicated at block 406, the method may include performing PHY FD processing of the PHY TD Rx signal by the SoC. For example, SoC 120 (FIG. 1) may perform the PHY FD processing of the PHY TD Rx signal, e.g., as described above.

As indicated at block 408, the method may include generating by the SoC a PHY TD Tx signal for transmission by the integrated RH. For example, SoC 120 (FIG. 1) may generate the Tx signal for transmission by the integrated RH 130 (FIG. 1), e.g., as described above.

As indicated at block 410, the method may include communicating the digital PHY TD Tx signal from the SoC to the integrated RH via the cable. For example, digital interface 138 (FIG. 1) may communicate the digital PHY TD Tx signal from the SoC 120 (FIG. 1) to integrated RH 130 (FIG. 1) via cable 125 (FIG. 1), e.g., as described above.

As indicated at block 412, the method may include generating by the PHY TD processor an RF Tx signal based on the digital PHY TD Tx signal. For example, PHY TD processor 136 (FIG. 1) may generate the RF Tx signal based on the digital PHY TD Tx signal, e.g., as described above.

As indicated at block 414, the method may include transmitting by the transceiver chain the RF Tx signal via the antenna. For example, transceiver chain 132 (FIG. 1) may transmit the RF Tx signal via the antenna 107 (FIG. 1), e.g., as described above.

Figure 5:
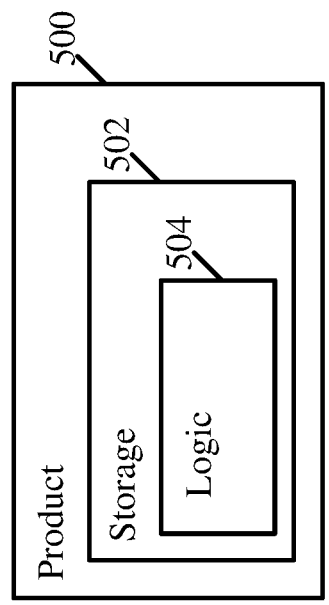
FIG. 5 is a schematic illustration of a product of manufacture, in accordance with some exemplary embodiments.

Reference is made to FIG. 5, which schematically illustrates a product of manufacture 500, in accordance with some exemplary embodiments. Product 500 may include one or more tangible computer-readable ("machine-readable") non-transitory storage media 502, which may include computer-executable instructions, e.g., implemented by logic 504, operable to, when executed by at least one computer processor, enable the at least one computer processor to implement one or more operations at device 102 (FIG. 1), DRS 110 (FIG. 1), integrated RH 130 (FIG. 1), SoC 120 (FIG. 1), PHY TD processor 136 (FIG. 1), transceiver chain 134 (FIG. 1), digital interface 138 (FIG. 1), controller 124 (FIG. 1), and/or message processor 128 (FIG. 1), to cause device 102 (FIG. 1), DRS 110 (FIG. 1), integrated RH 130 (FIG. 1), SoC 120 (FIG. 1), PHY TD processor 136 (FIG. 1), transceiver chain 134 (FIG. 1), digital interface 138 (FIG. 1), controller 124 (FIG. 1), and/or message processor 128 (FIG. 1), to perform, trigger and/or implement one or more operations and/or functionalities, and/or to perform, trigger and/or implement one or more operations and/or functionalities described with reference to the FIGS. 1, 2, 3, and/or 4, and/or one or more operations described herein. The phrases "non-transitory machine-readable medium" and "computer-readable non-transitory storage media" may be directed to include all computer-readable media, with the sole exception being a transitory propagating signal.

In some demonstrative embodiments, product 500 and/or machine-readable storage media 502 may include one or more types of computer-readable storage media capable of storing data, including volatile memory, non-volatile memory, removable or non-removable memory, erasable or non-erasable memory, writeable or re-writeable memory, and the like. For example, machine-readable storage media 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising an integrated Radio Head (RH), the integrated RH comprising an antenna; a transceiver chain to transmit a Radio Frequency (RF) Transmit (Tx) signal via the antenna, and to receive an RF Receive (Rx) signal via the antenna; a Physical layer (PHY) time-domain (TD) processor configured to generate a digital PHY TD Rx signal based on the RF Rx signal, and to cause the transceiver chain to transmit the RF Tx signal based on a digital PHY TD Tx signal; and a digital interface to communicate the digital PHY TD Tx signal and the digital PHY TD Rx signal over a digital link.

Example 2 includes the subject matter of Example 1, and optionally, wherein the integrated RH comprises an RF chip integrated with the antenna, the RF chip comprising the transceiver chain, the PHY TD processor and the digital interface.

Example 3 includes the subject matter of Example 1 or 2, and optionally, wherein the transceiver chain comprises an RF Front End (FE).

Example 4 includes the subject matter of Example 3, and optionally, wherein the RF FE comprises an active FE comprising one or more amplifiers.

Example 5 includes the subject matter of Example 3, and optionally, wherein the RF FE comprises a passive FE comprising one or more passive filters.

Example 6 includes the subject matter of any one of Examples 1-5, and optionally, wherein the integrated RH comprises a single-antenna RH comprising a single antenna and a single transceiver chain.

Example 7 includes the subject matter of any one of Examples 1-6, and optionally, wherein the digital interface is configured to communicate the digital PHY TD Tx signal and the digital PHY TD Rx signal via a digital input/Output (IO) cable.

Example 8 includes the subject matter of any one of Examples 1-7, and optionally, wherein the integrated RH comprises a multi-band RH configured for concurrent operation over a plurality of wireless communication frequency bands.

Example 9 includes the subject matter of any one of Examples 1-8, and optionally, wherein the integrated RH comprises a regulatory pre-certified RH.

Example 10 includes the subject matter of any one of Examples 1-9, and optionally, wherein the digital interface is configured to communicate the digital PHY TD Tx signal and the digital PHY TD Rx signal with a PHY frequency-domain (FD) processor separate from the integrated RH.

Example 11 includes a wireless communication device comprising a Distributed Radio System (DRS), the DRS comprising one or more integrated Radio Heads (RHs), an integrated RH of the one or more integrated RHs comprising an antenna; a transceiver chain to transmit a Radio Frequency (RF) Transmit (Tx) signal via the antenna, and to receive an RF Receive (Rx) signal via the antenna; a Physical layer (PHY) time-domain (TD) processor configured to generate a digital PHY TD Rx signal based on the RF Rx signal, and to cause the transceiver chain to transmit the RF Tx signal based on a digital PHY TD Tx signal; and a digital interface to communicate the digital PHY TD Tx signal and the digital PHY TD Rx signal over a digital link; a System on Chip (SoC) configured to generate one or more PHY TD Tx signals for transmission by the one or more integrated RHs, and to perform PHY frequency-domain (FD) processing of one or more PHY TD Rx signals from the one or more integrated RHs; and one or more cables to connect between the SoC and the one or more integrated RHs.

Example 12 includes the subject matter of Example 11, and optionally, comprising a plurality of integrated RHs.

Example 13 includes the subject matter of Example 12, and optionally, wherein the plurality of integrated RHs comprises at least a first integrated RH and a second integrated RH, which is non-collocated with the first integrated RH.

Example 14 includes the subject matter of Example 13, and optionally, wherein the first integrated RH and the second integrated RH are on opposite sides of the wireless communication device.

Example 15 includes the subject matter of any one of Examples 12-14, and optionally, wherein the SoC is configured to control concurrent communication via two or more of the plurality of integrated RHs.

Example 16 includes the subject matter of any one of Examples 12-15, and optionally, wherein the SoC is configured to perform PHY FD processing based on a combination of two or more PHY TD Rx signals from two or more respective integrated RHs, and to generate two or more PHY TD Tx signals for the two or more respective integrated RHs based on PHY FD processing of data to be transmitted by the two or more respective integrated RHs.

Example 17 includes the subject matter of any one of Examples 12-14, and optionally, wherein the SoC is configured to control selective activation for communication of one or more of the plurality of integrated RHs.

Example 18 includes the subject matter of any one of Examples 11-17, and optionally, comprising a first SoC connected to a first plurality of integrated RHs, and a second SoC connected to a second plurality of integrated RHs.

Example 19 includes the subject matter of Example 18, and optionally, wherein the first SoC is connected to the second SoC, the first and second SoCs configured to cooperatively process communications over the first and second pluralities of integrated RHs.

Example 20 includes the subject matter of any one of Examples 11-19, and optionally, wherein the integrated RH comprises an RF chip integrated with the antenna, the RF chip comprising the transceiver chain, the PHY TD processor and the digital interface.

Example 21 includes the subject matter of any one of Examples 11-20, and optionally, wherein the transceiver chain comprises an RF Front End (FE).

Example 22 includes the subject matter of Example 21, and optionally, wherein the RF FE comprises an active FE comprising one or more amplifiers.

Example 23 includes the subject matter of Example 21, and optionally, wherein the RF FE comprises a passive FE comprising one or more passive filters.

Example 24 includes the subject matter of any one of Examples 11-23, and optionally, wherein the integrated RH comprises a single-antenna RH comprising a single antenna and a single transceiver chain.

Example 25 includes the subject matter of any one of Examples 11-24, and optionally, wherein the integrated RH comprises a multi-band RH configured for concurrent operation over a plurality of wireless communication frequency bands.

Example 26 includes the subject matter of any one of Examples 11-25, and optionally, wherein the integrated RH comprises a regulatory pre-certified RH.

Example 27 includes the subject matter of any one of Examples 11-26, and optionally, wherein the one or more cables comprise one or more digital input/Output (IO) cables.

Example 28 includes the subject matter of any one of Examples 11-27, and optionally, comprising a memory to store instructions of an operating system of the wireless communication device, and a storage to store data processed by the wireless communication device.

Example 29 includes a method of wireless communication to be performed at a Distributed Radio System (DRS) of a wireless communication device, the method comprising generating, by a Physical layer (PHY) time-domain (TD) processor of an integrated Radio Head (RH), a digital PHY TD Receive (Rx) signal based on a Radio Frequency (RF) Rx signal received by a transceiver chain of the integrated RH via an antenna of the integrated RH; communicating the digital PHY TD Rx signal from the integrated RH to a System on Chip (SoC) via a cable; performing PHY frequency-domain (FD) processing of the PHY TD Rx signal by the SoC; generating, by the SoC, a PHY TD Tx signal for transmission by the integrated RH; communicating the digital PHY TD Tx signal from the SoC to the integrated RH via the cable; generating, by the PHY TD processor, an RF Tx signal based on the digital PHY TD Tx signal; and transmitting by the transceiver chain the RF Tx signal via the antenna.

Example 30 includes the subject matter of Example 29, and optionally, wherein the integrated RH comprises an RF chip integrated with the antenna, the RF chip comprising the transceiver chain, the PHY TD processor and the digital interface.

Example 31 includes the subject matter of Example 29 or 30, and optionally, wherein the transceiver chain comprises an RF Front End (FE).

Example 32 includes the subject matter of Example 31, and optionally, wherein the RF FE comprises an active FE comprising one or more amplifiers.

Example 33 includes the subject matter of Example 31, and optionally, wherein the RF FE comprises a passive FE comprising one or more passive filters.

Example 34 includes the subject matter of any one of Examples 29-33, and optionally, wherein the integrated RH comprises a single-antenna RH comprising a single antenna and a single transceiver chain.

Example 35 includes the subject matter of any one of Examples 29-34, and optionally, wherein the integrated RH comprises a multi-band RH configured for concurrent operation over a plurality of wireless communication frequency bands.

Example 36 includes the subject matter of any one of Examples 29-35, and optionally, wherein the integrated RH comprises a regulatory pre-certified RH.

Example 37 includes the subject matter of any one of Examples 29-36, and optionally, wherein the cable comprises a digital input/Output (IO) cable.

Example 38 includes an apparatus of wireless communication to be performed at a Distributed Radio System (DRS) of a wireless communication device, the apparatus comprising means for generating, by a Physical layer (PHY) time-domain (TD) processor of an integrated Radio Head (RH), a digital PHY TD Receive (Rx) signal based on a Radio Frequency (RF) Rx signal received by a transceiver chain of the integrated RH via an antenna of the integrated RH; means for communicating the digital PHY TD Rx signal from the integrated RH to a System on Chip (SoC) via a cable; means for performing PHY frequency-domain (FD) processing of the PHY TD Rx signal by the SoC; means for generating, by the SoC, a PHY TD Tx signal for transmission by the integrated RH; means for communicating the digital PHY TD Tx signal from the SoC to the integrated RH via the cable; means for generating, by the PHY TD processor, an RF Tx signal based on the digital PHY TD Tx signal; and means for transmitting by the transceiver chain the RF Tx signal via the antenna.

Example 39 includes the subject matter of Example 38, and optionally, wherein the integrated RH comprises an RF chip integrated with the antenna, the RF chip comprising the transceiver chain, the PHY TD processor and the digital interface.

Example 40 includes the subject matter of Example 38 or 39, and optionally, wherein the transceiver chain comprises an RF Front End (FE).

Example 41 includes the subject matter of Example 40, and optionally, wherein the RF FE comprises an active FE comprising one or more amplifiers.

Example 42 includes the subject matter of Example 40, and optionally, wherein the RF FE comprises a passive FE comprising one or more passive filters.

Example 43 includes the subject matter of any one of Examples 38-42, and optionally, wherein the integrated RH comprises a single-antenna RH comprising a single antenna and a single transceiver chain.

Example 44 includes the subject matter of any one of Examples 38-43, and optionally, wherein the integrated RH comprises a multi-band RH configured for concurrent operation over a plurality of wireless communication frequency bands.

Example 45 includes the subject matter of any one of Examples 38-44, and optionally, wherein the integrated RH comprises a regulatory pre-certified RH.

Example 46 includes the subject matter of any one of Examples 38-45, and optionally, wherein the cable comprises a digital input/Output (IO) cable.

Example 47 comprises an apparatus comprising means for executing any of the described operations of Examples 1-46.

Example 48 comprises a machine readable medium that stores instructions for execution by a processor to perform any of the described operations of Examples 1-46.

Example 49 comprises a method to perform any of the described operations of Examples 1-46.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
   an integrated Radio Head (RH), the integrated RH comprising:
      a Radio Frequency (RF) chip integrated with an antenna, the RF chip comprising:
         a transceiver chain to transmit an RF Transmit (Tx) signal via the antenna, and to receive an RF Receive (Rx) signal via the antenna;
         a Physical layer (PHY) time-domain (TD) processor configured to generate a digital PHY TD Rx signal based on the RF Rx signal, and to cause the transceiver chain to transmit the RF Tx signal based on a digital PHY TD Tx signal; and
         a digital interface to communicate the digital PHY TD Tx signal and the digital PHY TD Rx signal over a digital link with a PHY frequency-domain (FD) processor separate from the integrated RH.

2. The apparatus of claim 1, wherein the transceiver chain comprises an RF Front End (FE).

3. The apparatus of claim 2, wherein the RF FE comprises an active FE comprising one or more amplifiers.

4. The apparatus of claim 2, wherein the RF FE comprises a passive FE comprising one or more passive filters.

5. The apparatus of claim 1, wherein the integrated RH comprises a single-antenna RH comprising a single antenna and a single transceiver chain.

6. The apparatus of claim 1, wherein the digital interface is configured to communicate the digital PHY TD Tx signal and the digital PHY TD Rx signal via a digital input/Output (IO) cable.

7. The apparatus of claim 1, wherein the integrated RH comprises a multi-band RH configured for concurrent operation over a plurality of wireless communication frequency bands.

8. The apparatus of claim 1, wherein the integrated RH comprises a regulatory pre-certified RH.

9. The apparatus of claim 1, wherein the integrated RH is configured for implementation as part of a Distributed Radio System (DRS) comprising the integrated RH and the PHY FD processor in a wireless communication device.

10. A wireless communication device comprising:
    a Distributed Radio System (DRS), the DRS comprising:
       one or more integrated Radio Heads (RHs), an integrated RH of the one or more integrated RHs comprising:
          a Radio Frequency (RF) chip integrated with an antenna, the RF chip comprising:
             a transceiver chain to transmit an RF Transmit (Tx) signal via the antenna, and to receive an RF Receive (Rx) signal via the antenna;
             a Physical layer (PHY) time-domain (TD) processor configured to generate a digital PHY TD Rx signal based on the RF Rx signal, and to cause the transceiver chain to transmit the RF Tx signal based on a digital PHY TD Tx signal; and
             a digital interface to communicate the digital PHY TD Tx signal and the digital PHY TD Rx signal over a digital link;
       a System on Chip (SoC) configured to generate one or more digital PHY TD Tx signals for transmission by the one or more integrated RHs, the one or more digital PHY TD Tx signals comprising the digital PHY TD Tx signal, and to perform PHY frequency-domain (FD) processing based on one or more digital PHY TD Rx signals from the one or more integrated RHs, the one or more digital PHY TD Rx signals comprising the digital PHY TD Rx signal; and
       one or more cables to connect between the SoC and the one or more integrated RHs.

11. The wireless communication device of claim 10 comprising a plurality of integrated RHs.

12. The wireless communication device of claim 11, wherein the plurality of integrated RHs comprises at least a first integrated RH and a second integrated RH, which is non-collocated with the first integrated RH.

13. The wireless communication device of claim 12, wherein the first integrated RH and the second integrated RH are on opposite sides of the wireless communication device.

14. The wireless communication device of claim 11, wherein the SoC is configured to control concurrent communication via two or more of the plurality of integrated RHs.

15. The wireless communication device of claim 11, wherein the SoC is configured to perform the PHY FD processing based on a combination of two or more digital PHY TD Rx signals from two or more respective integrated RHs, and to generate two or more digital PHY TD Tx signals for the two or more respective integrated RHs based on PHY FD processing of data to be transmitted by the two or more respective integrated RHs.

16. The wireless communication device of claim 11, wherein the SoC is configured to control selective activation for communication of one or more of the plurality of integrated RHs.

17. The wireless communication device of claim 10 comprising a first SoC connected to a first plurality of integrated RHs, and a second SoC connected to a second plurality of integrated RHs.

18. The wireless communication device of claim 17, wherein the first SoC is connected to the second SoC, the first and second SoCs configured to cooperatively process communications over the first and second pluralities of integrated RHs.

19. The wireless communication device of claim 10, wherein the integrated RH comprises a single-antenna RH comprising a single antenna and a single transceiver chain.

20. The wireless communication device of claim 10, wherein the integrated RH comprises a multi-band RH configured for concurrent operation over a plurality of wireless communication frequency bands.

21. The wireless communication device of claim 10 comprising a memory to store instructions of an operating system of the wireless communication device, and a storage to store data processed by the wireless communication device.

22. An apparatus of a wireless communication device, the apparatus comprising:
Distributed Radio System (DRS) means configured for distributed implementation of an integrated Radio Head (RH) and a System on Chip (SoC) in the wireless communication device, the integrated RH comprising a Radio Frequency (RF) chip integrated with an antenna, the DRS means comprising:
means for generating, by a Physical layer (PHY) time-domain (TD) processor of the RF chip, a digital PHY TD Receive (Rx) signal based on an RF Rx signal received by a transceiver chain of the RF chip via the antenna of the integrated RH;
means for communicating the digital PHY TD Rx signal from the integrated RH to the SoC via a cable;
means for performing PHY frequency-domain (FD) processing based on the digital PHY TD Rx signal by the SoC;
means for generating, by the SoC, a digital PHY TD Tx signal for transmission by the integrated RH;
means for communicating the digital PHY TD Tx signal from the SoC to the integrated RH via the cable;
means for generating, by the PHY TD processor, an RF Tx signal based on the digital PHY TD Tx signal; and
means for transmitting by the transceiver chain the RF Tx signal via the antenna.

23. The apparatus of claim 22, wherein the integrated RH comprises a single-antenna RH comprising a single antenna and a single transceiver chain.

\* \* \* \* \*